(12) United States Patent
Heidenreich

(10) Patent No.: US 8,062,604 B2
(45) Date of Patent: Nov. 22, 2011

(54) FILTER ELEMENT

(75) Inventor: Steffen Heidenreich, Stimpfach (DE)

(73) Assignee: Pall Corporation, Port Washington, NY (US)

( * ) Notice: Subject to any disclaimer, the term of this patent is extended or adjusted under 35 U.S.C. 154(b) by 0 days.

(21) Appl. No.: 12/183,327

(22) Filed: Jul. 31, 2008

(65) Prior Publication Data

US 2008/0286166 A1 Nov. 20, 2008

Related U.S. Application Data

(63) Continuation of application No. 10/500,320, filed as application No. PCT/EP02/14780 on Dec. 27, 2002, now abandoned.

(30) Foreign Application Priority Data

Dec. 29, 2001 (DE) ................................ 101 64 480

(51) Int. Cl.
*B01D 50/00* (2006.01)
(52) U.S. Cl. ........................................ 422/180; 422/177
(58) Field of Classification Search .................. 422/177, 422/180
See application file for complete search history.

(56) References Cited

U.S. PATENT DOCUMENTS

| 4,243,536 | A | * | 1/1981 | Prolss ........................ 210/321.84 |
| 4,350,613 | A | * | 9/1982 | Nishino et al. ................ 502/200 |
| 5,242,472 | A | * | 9/1993 | Sellakumar ..................... 95/280 |
| 5,294,411 | A | | 3/1994 | Breuer et al. |
| 5,925,156 | A | * | 7/1999 | Motoki et al. ................... 55/487 |
| 5,948,257 | A | * | 9/1999 | Custer et al. ............. 210/500.26 |
| 6,635,339 | B1 | | 10/2003 | Adler et al. |

FOREIGN PATENT DOCUMENTS

| DE | 37 05 793 A1 | 11/1987 |
| DE | 36 34 360 A1 | 3/1988 |
| DE | 298 08 664 U1 | 10/1998 |
| EP | 0 470 659 A1 | 2/1992 |
| JP | 62-252383 A | 11/1987 |
| JP | 62252383 A * | 11/1987 |
| JP | 10-28826 A | 7/1996 |
| JP | 09-295854 A | 11/1997 |
| WO | WO 90/12950 | 11/1990 |

OTHER PUBLICATIONS

E. J. A. E. Williams, "*Expanded Ceramic Foam*", Journal of Materials Science, 31, (1996) Chapman and Hall, pp. 559-563.
"Carbon-chain polymers" from Britannica Online Encyclopedia (www.britannica.com, printed Apr. 19, 2011).

* cited by examiner

*Primary Examiner* — Tom Duong
(74) *Attorney, Agent, or Firm* — Leydig, Voit & Mayer, Ltd.

(57) ABSTRACT

A filter element comprises a dimensionally stable porous formed body with an interior that provides a space for unfiltered fluid or a filtrate space. The interior of the formed body is partially filled with a material of expanded ceramics that is coated with a catalyst material such that a flow channel remains open. The material that is coated with catalyst material is provided in the form of a dimensionally stable catalyst body which is inserted into the interior such that it adjoins the formed body.

15 Claims, 11 Drawing Sheets

FILTER ELEMENT

The invention pertains to a filter element according to the preamble of Claim 1.

The reduction of nitrogen oxides in gases is carried out in solid catalysts by means of a selective reaction between the nitrogen oxides and the reduction agents. Correspondingly high gas temperatures are required in order to achieve a sufficiently high catalytic activity and to prevent saline deposits from forming on the catalyst surfaces because this would lead to a deactivation of the catalyst. For example, reduction catalysts for the cleaning of flue gases in power plants are used at temperatures of approximately 300° C.-350° C. in the flue gas flow between the boiler and the air preheater.

The ceramic catalyst material usually consists of rigid plates or honeycomb elements, but may also be present in the form of bulk material layers.

In the so-called low-dust method, an electrostatic hot gas filter for largely separating the dust is arranged upstream of the honeycomb elements or plate catalysts. In the so-called high-dust method, the gas passes the reactor filled with a catalyst without prior dedusting. In this case, the individual catalyst elements need to contain correspondingly large flow channels for the gas in order to prevent clogging.

In all aforementioned variations, other voluminous and complex apparatuses for the separation of nitrogen oxide need to be provided in addition to the already existing apparatuses and devices for the precipitation of other pollutant components. Such a complicated gas cleaning technique is particularly disadvantageous when only comparatively small gas quantities need to be treated.

Consequently, DE 36 34 360 proposes to mix the gases containing nitrogen oxide with the reduction agent and to convey the mixture through at least one catalytically active filter element that consists of a ceramic carrier material and the catalytically active substances. The catalytically active filter element is also used for dedusting the gases containing nitrogen oxide. The filter element consists of felts or fleeces that are manufactured from fibers of the ceramic carrier material by means of compaction and doped with the catalytically active substances. The filter element may also consist of porous sintered elements that are manufactured by sintering granules of the ceramic carrier material and doping the carrier material with the catalytically active substances. The filter element may have the shape of a filter candle. The doping of the ceramic carrier material with the catalytically active substances is realized by applying these substances onto the ceramic carrier material before, during or after the manufacture of the felts, fleeces or sintered elements. This may, for example, be realized by impregnating the filter elements with a saline solution and subsequently heating the salt-doped filter elements.

DE 37 05 793 describes a filter device for cleaning gases which comprises a single tubular element of a heat-resistant expanded ceramic material that simultaneously acts as a dust filter and, with a corresponding coating, as a catalyst.

EP 0 470 659 describes a method for separating dust and organic compounds from gases that contain oxygen, in particular, combustion gases. In this case, the exhaust gas to be cleaned is conveyed through at least one catalytically active filter element that is composed of a ceramic carrier material and the catalytically active substances. The filter element may consist of a porous sintered element that is manufactured by sintering granules of the ceramic carrier material and doped with the catalytically active substances.

WO 9012950 describes a filter for diesel exhaust particulates which consists of honeycomb elements, wherein the first honeycomb elements are provided with a first surface layer and conventionally cause a catalytic conversion of nitrogen oxides and carbon monoxide into nitrogen and carbon dioxide, respectively. In this case, the second honeycomb elements are provided with a second surface layer and catalytically cause a reduction in the ignition temperature of the exhaust particulates adhering thereon.

WO 9803249 discloses a hot gas cleaning device in the form of the filter candle. On the outside, the filter candle is provided with a membrane layer of ultra-fine silicone carbide particles in order to filter out dust particles. A catalytically active layer of sintered silicone carbide powder is arranged on the inside thereof viewed in the flow direction. The catalyst consists of a vanadium-titanium compound, with which the silicone carbide filter is impregnated. The filter candle is manufactured by subsequently coating a porous element. This has the disadvantage that the porous layer cannot be uniformly applied such that the catalyst material is not homogenously distributed. Another problem can be seen in the adhesion of the applied layer on the silicone carbide particles. This problem becomes even more significant due to the fact that temperature fluctuations occur in the region of the hot gas filtration which could promote a separation of the coating from the silicon carbide particles.

Consequently, the invention is based on the objective of making available a filter element that can be easily adapted to the respective filtration task and in which the risk of the catalytically active components separating from the filter is largely eliminated.

This objective is attained with a filter element according to Claim 1.

The filter element is characterized by the fact that the interior of a formed body is partially filled with a catalyst material or a material that is coated with catalyst material such that a flow channel remains open.

The term formed body refers to a conventional porous formed body, in particular, a ceramic formed body, that has a porous support structure and is provided with a porous membrane layer on the side of the unfiltered fluid. Such known formed bodies are preferably also utilized for the filter element according to the invention, wherein the filter element is, however, not limited to this type of formed bodies.

The standard material for the membrane layer consists of granular mullite. However, it would also be possible to utilize other materials. All ceramic oxides, nitrites and carbides are generally suitable for this purpose.

The membrane layer may also consist of an asymmetric membrane layer that is composed of several layers. The membrane layer thickness may amount up to 200 µm, wherein the pore size may lie between 0.05 and 40 µm. The membrane layer is manufactured from bound inert grain or from fine particles by means of polymer sol-gel methods. Spraying, electrophoresis, film casting, slip casting or the sol-gel method may be considered as coating methods.

The partial filling of the interior of the formed body with the catalyst material or with a material that is coated with catalyst material provides the advantage that identical prefabricated formed bodies can be used for the manufacture of filter elements. These filter elements can be adapted to the respective filtration task by selecting the appropriate catalyst material or filling. This makes it possible to realize a filter element kit such that a filter that fulfills the corresponding requirements can be easily and rapidly produced and the manufacturing costs of the filter elements can be lowered.

The partial filling of the interior of the formed body such that a defined inner flow channel remains open has certain advantages in comparison to a completely filled interior. For example, a uniform flow of the fluid through the catalyst layer is ensured without risking that bypass flows occur. If the formed body is completely filled, it is also disadvantageous that an uneven flow through the catalytically active bulk material can be expected in addition to bypass flows caused by the marginal flow conditions. This means that a controlled flow through the catalyst material or the material coated with catalyst material is ensured.

The filter elements may have different structural shapes. Consequently, the term filter elements refers to all structural shapes in which, for example, the fluid to be filtered flows against the outer side of the filter element and its walls form an interior space that is sealed relative to the unfiltered fluid and open toward the filtrate chamber. In filter elements of this type, the flow direction of the fluid may also be reversed, but a filter element in which the fluid flows against the inner side is not equally well suited for all filtration tasks. Of all possible structural shapes of filter elements, filter candles, filter cylinders and filter cassettes as they are described in greater detail below are particularly preferred.

The filter elements may be used for the filtration of gases, as well as for the filtration of liquids. One preferred application consists of the filtration of hot gases.

According to a first embodiment, a porous or perforated formed body insert that causes the flow channel to remain open is inserted into the interior of the formed body such that it is spaced apart from its wall. The intermediate space between the formed body and the formed body insert is filled with a bulk catalyst material or a bulk material that is coated with catalyst material.

The catalyst material is enclosed by the formed body and the formed body insert such that the risk of loosening the catalyst material is minimized. The catalyst material or the material coated with catalyst material is preferably highly porous and uniformly arranged in the interior with a constant layer thickness if the formed body insert is adapted to the shape of the formed body. This means that the same filtration result is achieved at all points during the filtration process. The term highly porous refers to a porosity greater than 60%.

The formed body insert preferably consists of a ceramic material, in particular, of aluminum oxide, silicone carbide, titanium dioxide, silicone dioxide, zirconium oxide, calcium aluminate and/or aluminosilicates. It would also be conceivable to utilize mixtures of the aforementioned ceramic materials for the manufacture of the formed body insert.

The formed body insert may also consist of a metal, e.g., special steel, Inconel or Hastelloy. Inconel® and Hastelloy® are trade names for nickel-based alloys that have special properties with respect to their heat and corrosion resistance.

If the filter element is used at low temperatures, i.e., temperatures that lie significantly below 100° C. it is also possible to manufacture the formed body insert of plastic. Preferred plastics that have a correspondingly porous structure are polypropylene, polyethylene, polyolefins, polyamides, polysulfone and polycarbonate.

The formed body insert may also consist of a perforated formed body insert. The term perforated formed body insert refers, for example, to screen-type bodies.

According to another embodiment, a dimensionally stable catalyst body is inserted into the interior such that it adjoins the formed body, wherein this catalyst body causes the flow channel to remain open and consists of a catalyst material or a material that is coated with catalyst material. The catalyst body may, for example, consist of a catalyst material that is sintered together and has as a porous structure analogous to the formed body such that fluid is also able to flow through the catalyst body. The partial filling of the interior of the formed body is realized in this embodiment by inserting a dimensionally stable catalyst body.

The uncoated material that is used in the form of a bulk material in the first-mentioned embodiment and in the form of a catalyst body in the second embodiment may consist of ceramic fibers or expanded ceramics, of metallic fibers or expanded metals and of plastic fibers or expanded plastics. The respective processing of these materials determines whether they are used in the form of a bulk material or a dimensionally stable body.

The filter element may contain a cylindrical or rectangular formed body with an interior space that is closed on one side. This design refers to so-called filter candles and filter cassettes. Cylindrical formed bodies are primarily utilized for filter candles and rectangular formed bodies are primarily used for filter cassettes.

The formed body insert may consist of a tube that is open on one or both sides. The term tube refers to a corresponding inner tube that, for example, is inserted into a filter candle. The question whether this tube is open on one or both sides depends on the bottom wall of the filter candle. If the bottom wall is permeable to the fluid, it is preferred to utilize a tube that is open on both sides as the formed body insert. If the bottom wall of the filter candle participates in the filtration process, it is proposed to utilize a formed body insert in the form of a tube that is closed on only one side and consequently also contains a bottom wall.

In a filter cassette that preferably contains a rectangular formed body, a correspondingly adapted formed body insert is used. This formed body insert can also be referred to as a tube although the axial length should be smaller than the diameter of the tube. In a rectangular formed body, a correspondingly shaped rectangular tube is realized. Since the bottom wall is also utilized for the filtration process in filter cassettes, the formed body insert also contains a bottom wall. This means that a tube which is closed on one side is used as the formed body insert in this case.

The catalyst body that, according to the above-mentioned second embodiment, is utilized in a filter element of this type also consists of a tube that is open on one or both sides when it is used in a cylindrical or rectangular formed body. The question whether a tube that is open on one or both sides is used depends on the design of the bottom wall in case of a filter candle as described above. When used in filter cassettes, the catalyst body also contains a bottom wall.

The filter element may also consist of a filter cylinder that, in principle, consists of a cylindrical formed body with an interior that is open on both sides. In this case, the formed body insert consists of a tube that is open on both sides, wherein the tube is fixed in position by corresponding cover elements arranged on the edge of the opening of the tube and of the formed body.

The catalyst body used in filter cylinders preferably also consists of a tube that is open on both sides.

In all embodiments, the formed body inserts, as well as the catalyst bodies, are realized in such a way that the entire filtration surface provided by the filter body can be utilized.

According to another embodiment, the filter element contains a disk-shaped formed body with a peripheral wall, a bottom wall and a top wall which enclose a disk-shaped interior. In this case, an inlet or outlet opening is respectively provided in the bottom wall and the top wall. As in the previously described embodiments, the formed body insert is realized in the form of a smaller version of the disk-shaped formed body, namely such that the formed body insert encloses a flow channel. This also applies to a catalyst body used in such a disk-shaped formed body. In order to introduce the formed body insert and the catalyst material or the material coated with catalyst material into the disk-shaped formed body or to install the catalyst body, the formed body is preferably divided in the plane of the disk and consequently realized in two parts.

The catalyst material consists of one or more oxides or mixed oxides of rare earths and/or of one or more aluminates and/or of one or more silicates and/or of one or more titanates or titanium dioxides.

The utilization of calcium aluminate is particularly preferred, wherein the calcium aluminate may be used exclusively or in combination with other oxides or mixed oxides.

It proved to be advantageous that the catalyst material is modified with catalyst promoters.

A particularly high effectiveness of the filter elements according to the invention is achieved if the catalyst material is doped with catalytically active precious or non-precious metals. Preferred doping materials are platinum, palladium, rhodium, gold, silver, nickel, copper, manganese, vanadium, tungsten and/or cobalt.

Another advantage of the invention can be seen in the fact that catalytically active ceramic filter elements are obtained which are resistant to high temperatures, vapors and heteroelement compounds. This means that these filter elements can be directly arranged within the hot flue gas or exhaust gas flow while simultaneously ensuring the dedusting of the hot gases, as well as the total conversion of organic pollutant components and residual components. In addition to the gas cleaning effect, the basic substances for the formation of dioxins (De-Novo synthesis) are simultaneously filtered out.

The catalytic realization of the filter elements may include the bifunctional effect of the catalyst system, i.e., the total oxidation and the thermal-catalytic separation and consequently the reactions described below which depend on the respective catalyst material and, if applicable, the doping material used:

Catalytic reaction of nitrogen oxides, catalytic cracking of long-chain hydrocarbons, catalytic disintegration of organic compounds that easily evaporate, total oxidation of carbon and carbon compounds, etc. However, the catalytic effect of the filter elements is not limited to these particular applications.

Exemplary embodiments of the invention are described in greater detail below with reference to the figures.

The figures show:

FIG. 1 the vertical section through a filter candle according to a first embodiment;

FIG. 2 a horizontal section through a filter candle according to a second embodiment;

FIG. 3 a vertical section through a filter candle according to a third embodiment;

FIG. 4 a vertical section through a filter candle according to a fourth embodiment;

FIG. 5 the vertical section through a filter cylinder according to a first embodiment;

FIG. 6 a vertical section through a filter cylinder according to a second embodiment;

FIG. 7 a perspective representation of a filter cassette;

FIG. 8 a vertical section through the first embodiment of the filter cassette shown in FIG. 7;

FIG. 9 a vertical section through a filter cassette according to a second embodiment;

FIG. 10 a vertical section through a filter disk according to a first embodiment, and FIG. 11 a section through a filter disk according to a second embodiment.

FIG. 1 shows a vertical section through a filter element 1 that is realized in the form of a filter candle 2. The filter candle 2 comprises a formed body 3 with a cylindrical peripheral wall 4 and a bottom wall 5. A porous formed body insert 7 in the form of an inner tube 7' is inserted into the cylindrical interior, wherein the formed body insert has an outside diameter that is smaller than the inside diameter of the peripheral wall 4 such that an annular intermediate space remains which is filled with a catalyst material 8. In order to prevent the catalyst material 8 from falling out, for example, when transporting the filter element 1, a non-porous tight cover disk 6 with an inlet or outlet opening 16 is fixed on the edge of the opening 15 of the filter element 1, wherein said cover disk also fixes the inner tube 7 in its position. The inner tube 7 is inserted into an annular recess 17 in the bottom wall 5 and, for example, fixed therein by means of a putty or cement. The bottom wall 5 is not permeable to the unfiltered fluid.

Due to this arrangement, a partial filling of the interior of the formed body 3 with catalyst material 8 is achieved, wherein said catalyst material has the uniform layer thickness over the entire periphery.

FIG. 1 also shows that the fluid flows against the filter element 1 from the radially outer side such that the space that surrounds the filter element 1 forms the space 11 for unfiltered fluid. The cylindrical flow channel 10 forms the filtrate space 12. The flow direction of this filter candle 2 may also be reversed as it is, for example, illustrated in FIG. 2. In this figure, the flow channel 10 forms the space for the unfiltered fluid and the space that surrounds the filter candle 2 forms the filtrate space 12.

FIG. 2 shows a filter candle 2, the bottom wall 5' of which consists of the same porous material as the peripheral wall 4 such that the bottom wall also participates in the filtration process. The formed body insert 7 also consists of an inner tube 7" in this embodiment, wherein the inner tube is, however, provided with a bottom wall 9. With respect to its shape and dimensions, the formed body insert 7 represents a smaller version of the formed body 4. An intermediate space that is filled with catalyst material 8 is also situated between the formed body insert 7 and the formed body 3 in this case. In this particular embodiment, catalyst material 8 is also situated between the two bottom walls 5' and 9. The layer thickness of the catalyst material 8 is identical at all locations in this embodiment such that the same filtration result is achieved in all effective filtration regions of the filter candle 2.

FIG. 3 shows another embodiment in which a dimensionally stable porous catalyst body 14 that adjoins the formed body 3 is inserted into the interior of the filter candle 2. The catalyst body has the shape of a tube that is open on both sides. When utilizing a filter candle with the formed body according to FIG. 2, the catalyst body 14 also is provided with a bottom wall. The end faces of the catalyst body 14 are fixed in the formed body by means of a putty, for example, high-temperature putty, or cement 13. Since the catalyst body 14 consists of a catalyst material or of a material coated with catalyst material, the interior of the formed body 3 also is partially filled with catalyst material in this embodiment.

FIG. 4 shows another embodiment that merely differs from the embodiment shown in FIG. 1 due to the fact that the intermediate space between the formed body insert 7 and the formed body 3 is filled with a material 8' that is coated with catalyst material.

FIG. 5 shows an embodiment of a filter element 1 in the form of a filter cylinder 20. A filter cylinder 20 differs from a filter candle 2 due to the fact that the filter cylinder, in principle, consists of a formed body 3 in the form of a cylindrical tube that is open on both sides. This means that the formed body insert 7 is also realized in the form of an inner tube 7'. In order to fix the catalyst material 8 in the cylindrical formed body 3, non-porous tight cover elements 6 are provided. These cover elements respectively contain an opening 16 in the region of the flow channel. The inner tube 7' has the same length as the formed body 3.

Figure 1:
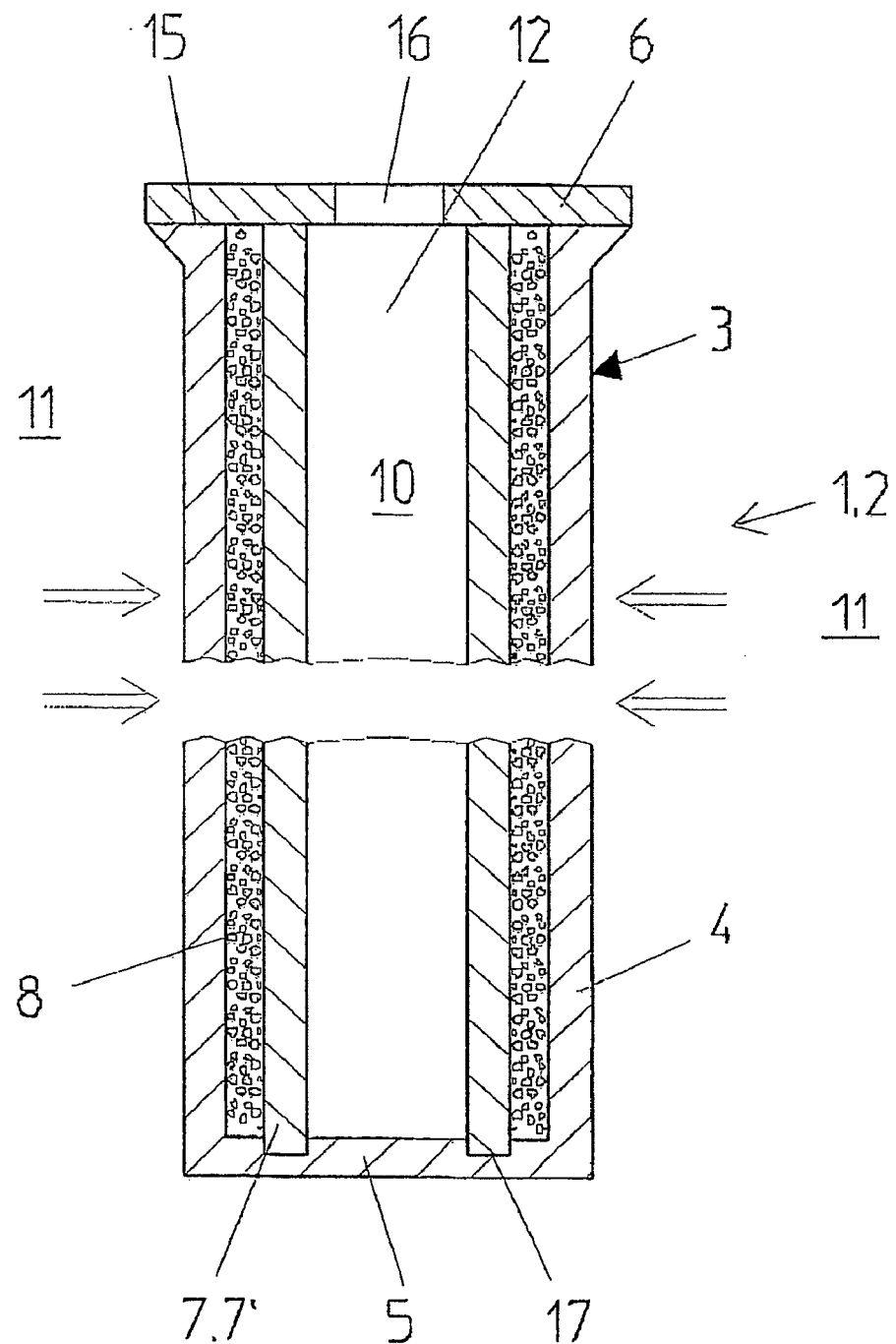
Figure 2:
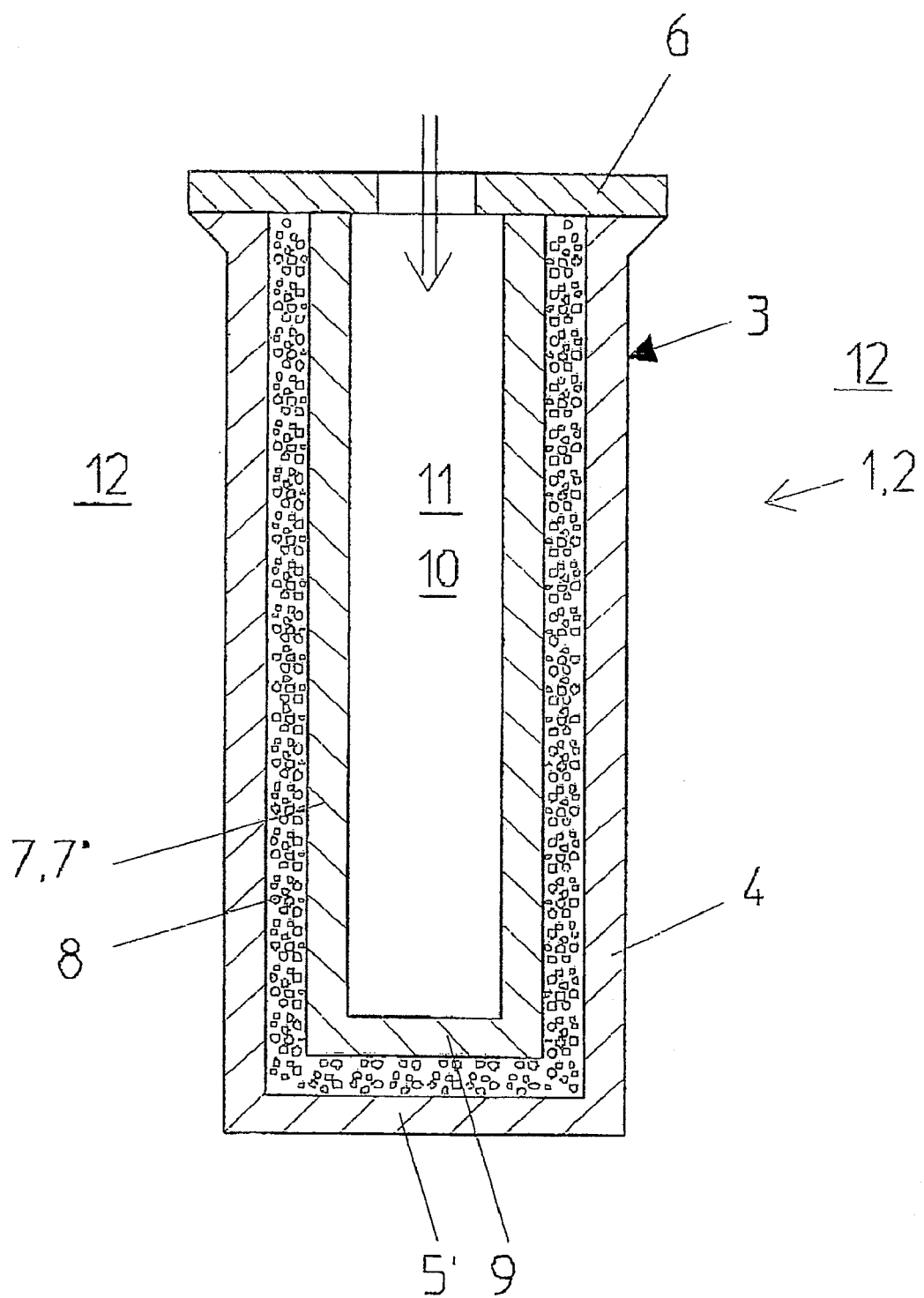
Figure 3:
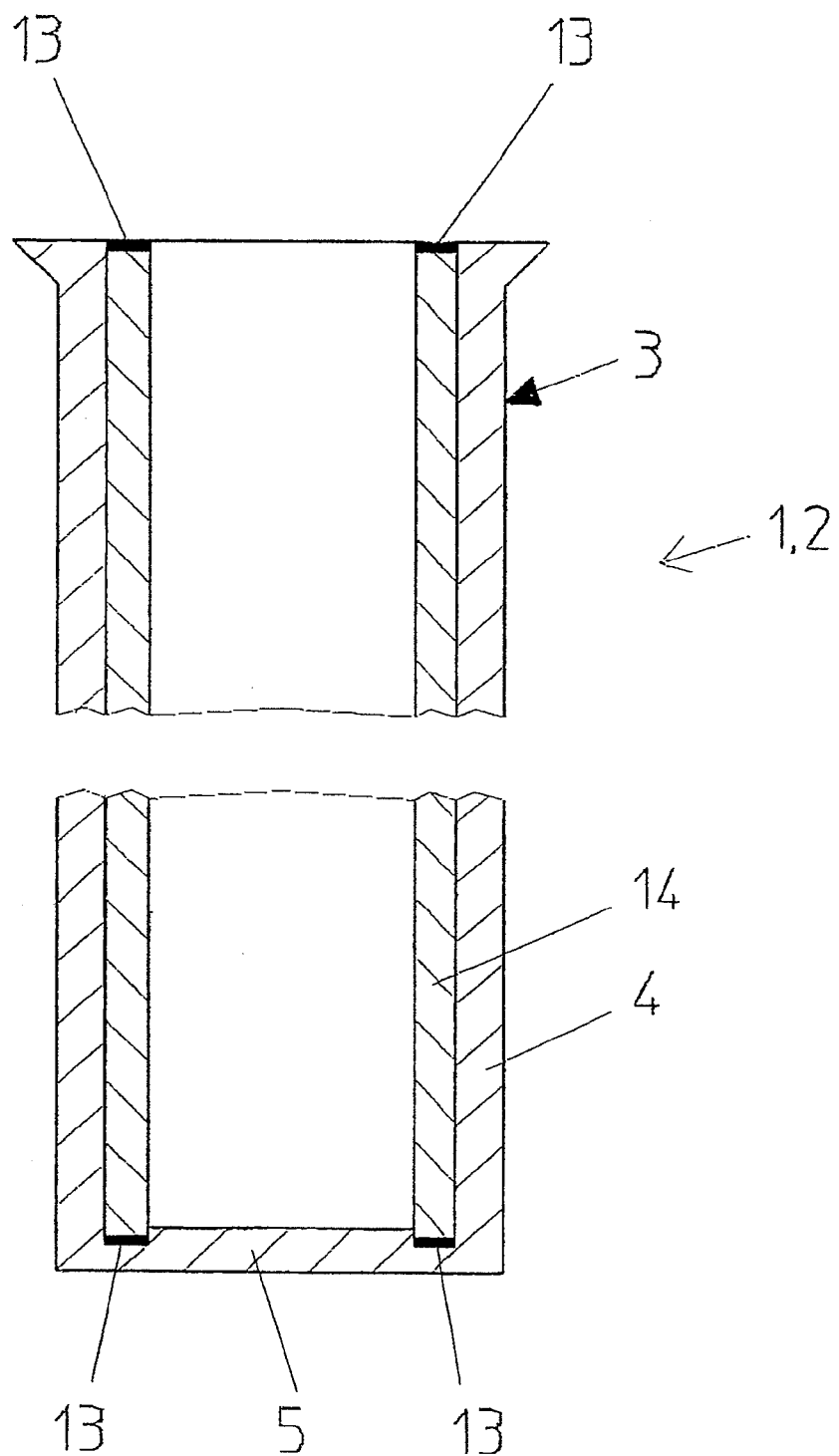
Figure 4:
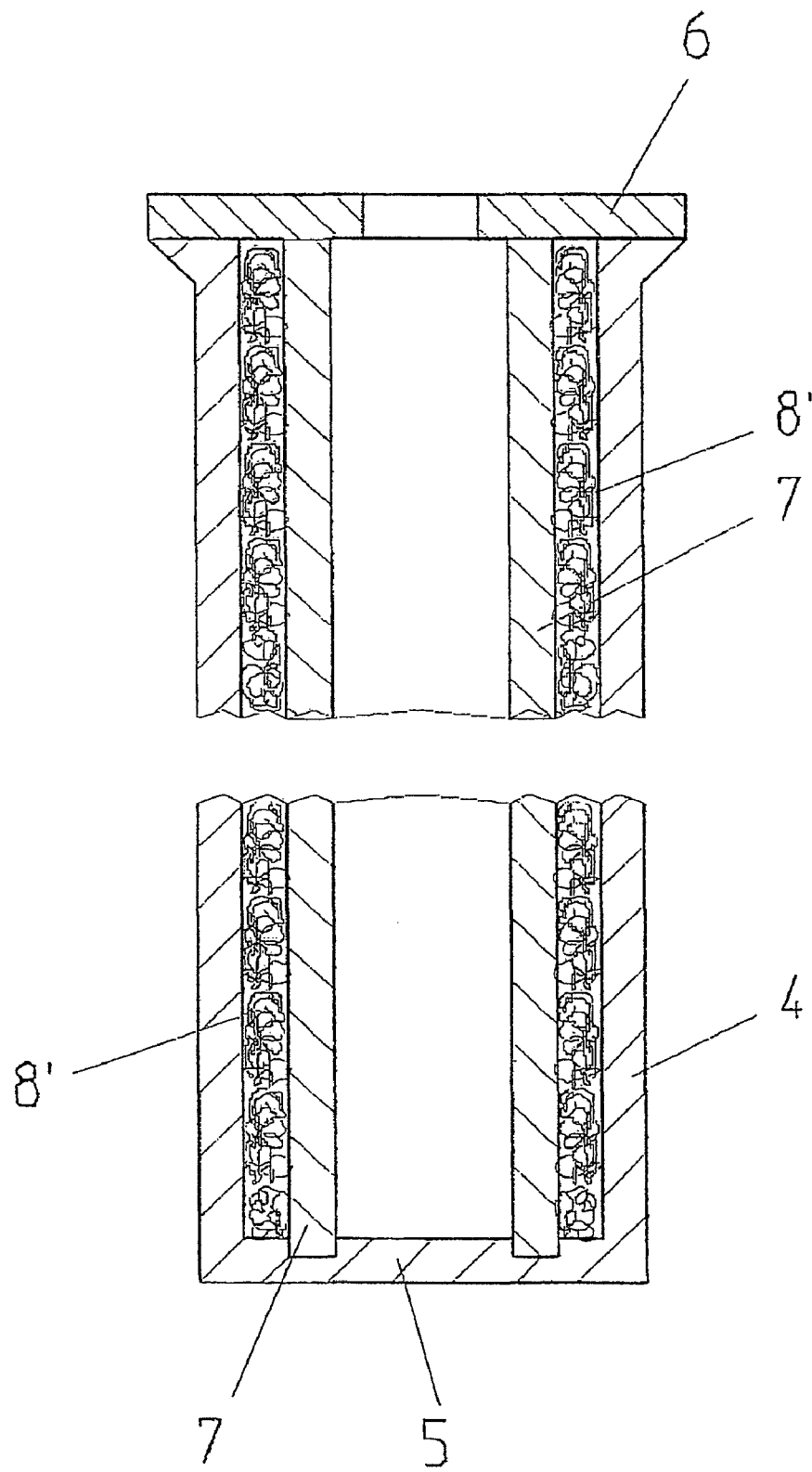
Figure 5:
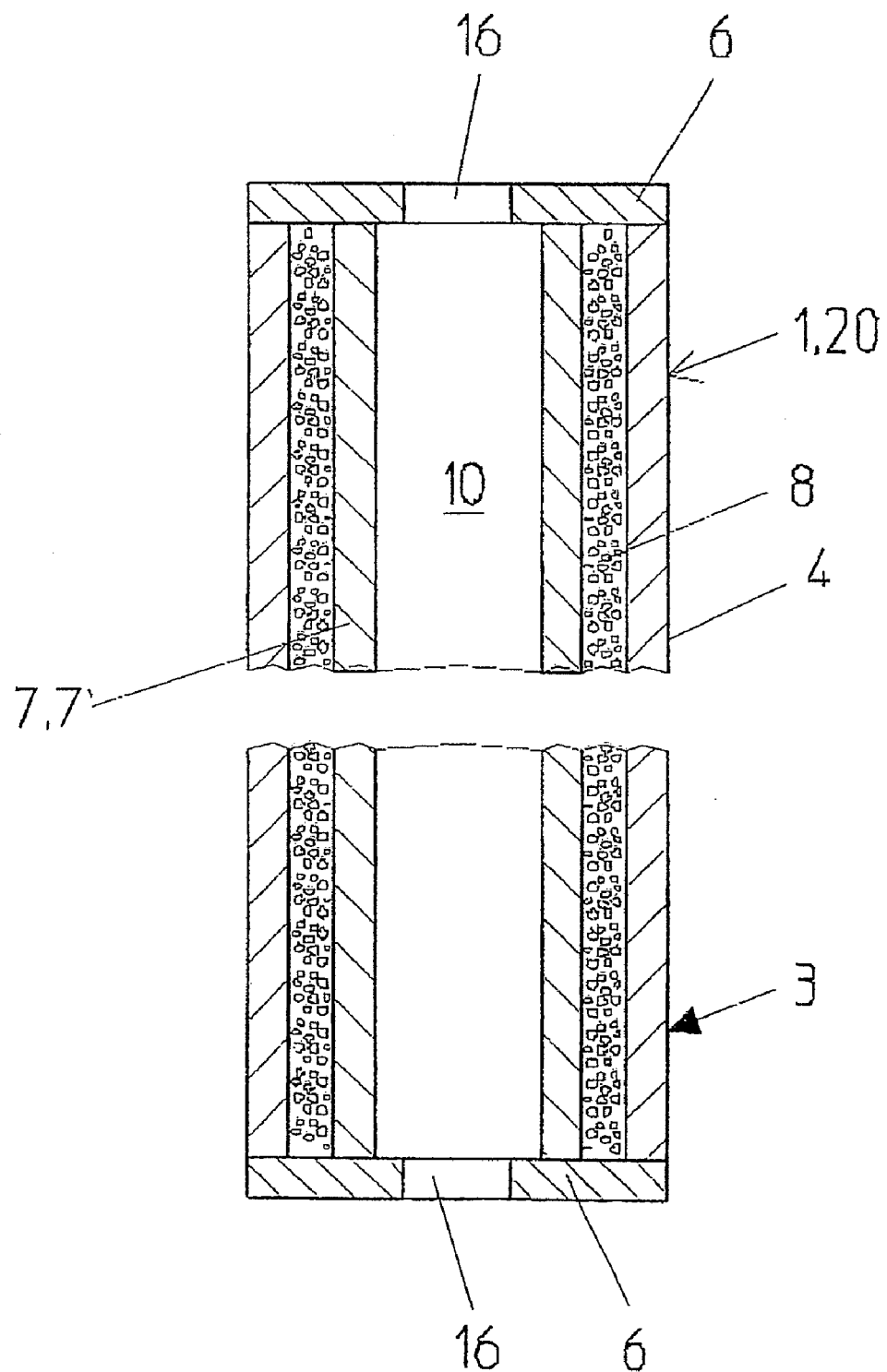
Figure 6:
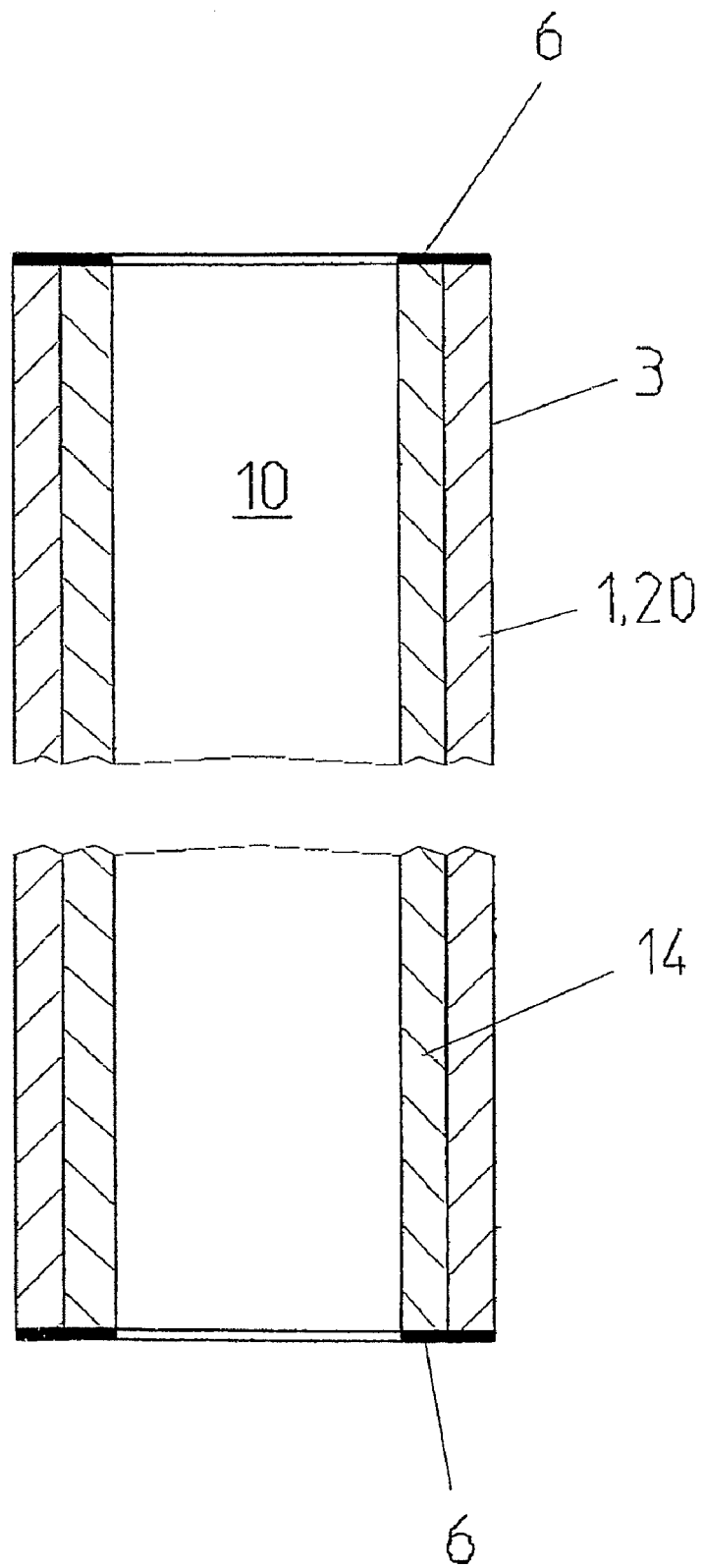
FIG. 6 shows an embodiment of a filter cylinder 20, the design of which corresponds to the filter candle according to FIG. 3.
Figure 7:
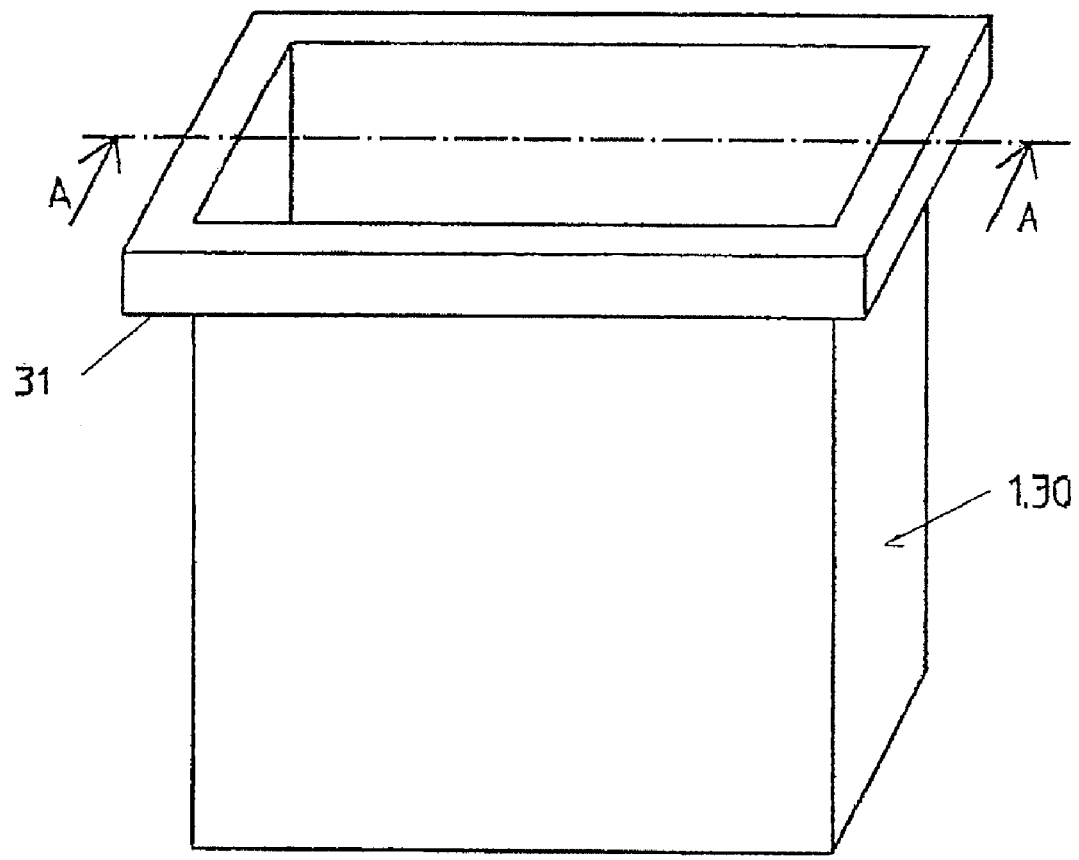
FIG. 7 shows a perspective representation of a filter cassette 30 that has a rectangular outside contour. The cassette is provided with a peripheral flange 31 on the edge of the opening.
Figure 8:
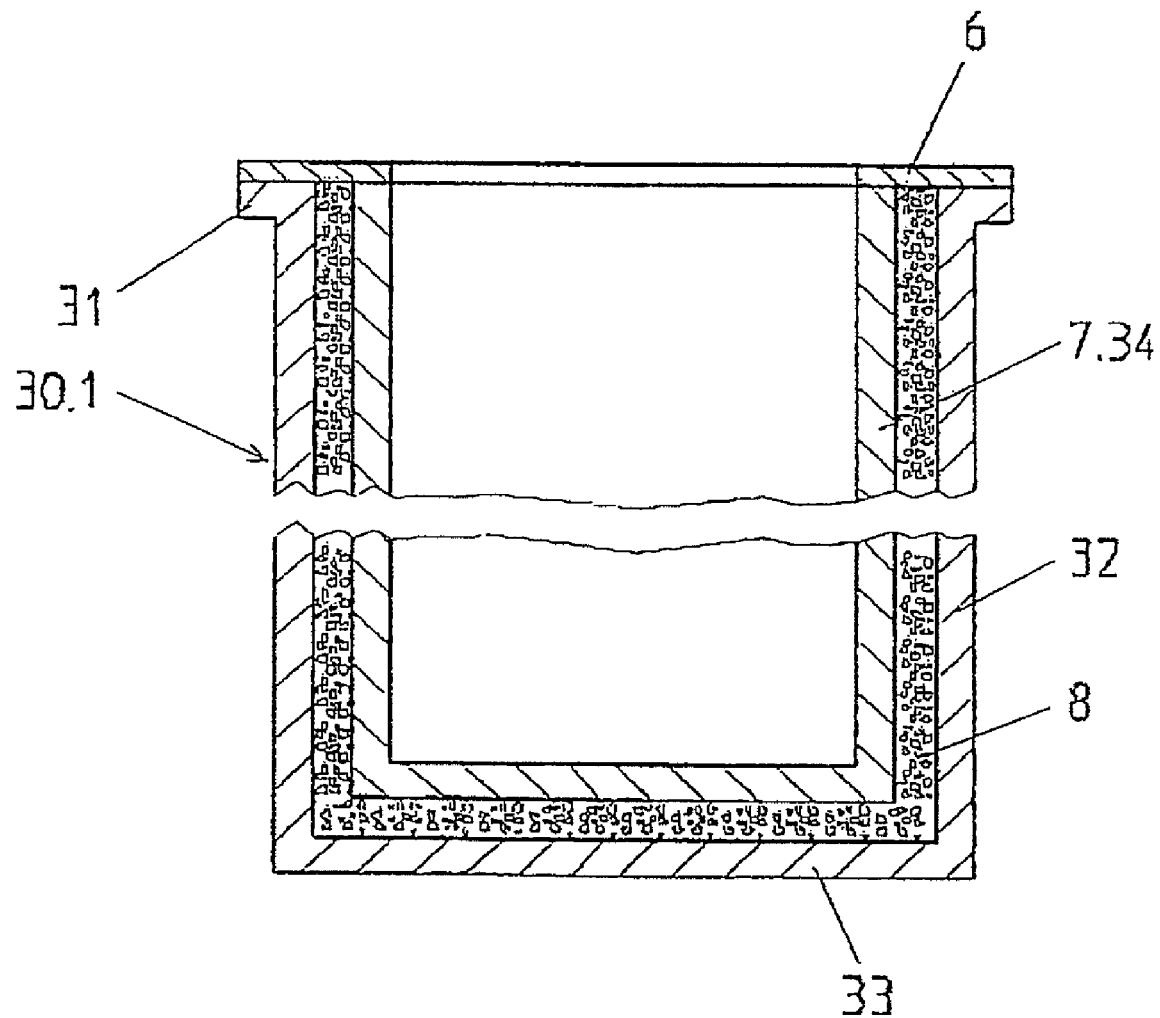

FIG. 8 shows a vertical section through the filter cassette 30 shown in FIG. 7 along the line A-A. The filter cassette 30 comprises a formed body 3 that has the shape of a tube that is closed on one side. This tubular formed body 3 may also be referred to as a cassette-shaped or pot-shaped formed body and has a peripheral wall 32 and a bottom wall 33. The formed body insert 34 represents a smaller version of the formed body 3 and consequently also has the shape of a tube that is closed on one side. This means that this formed body insert may also be referred to as a pot-shaped or cassette-shaped formed body insert. Catalyst material 8 is arranged in the intermediate space between the formed body 3 and the formed body insert 34. A tight cover 6 that seals the intermediate space containing a catalyst material and fixes the formed body insert 34 in its position is arranged on the flange.

Figure 9:
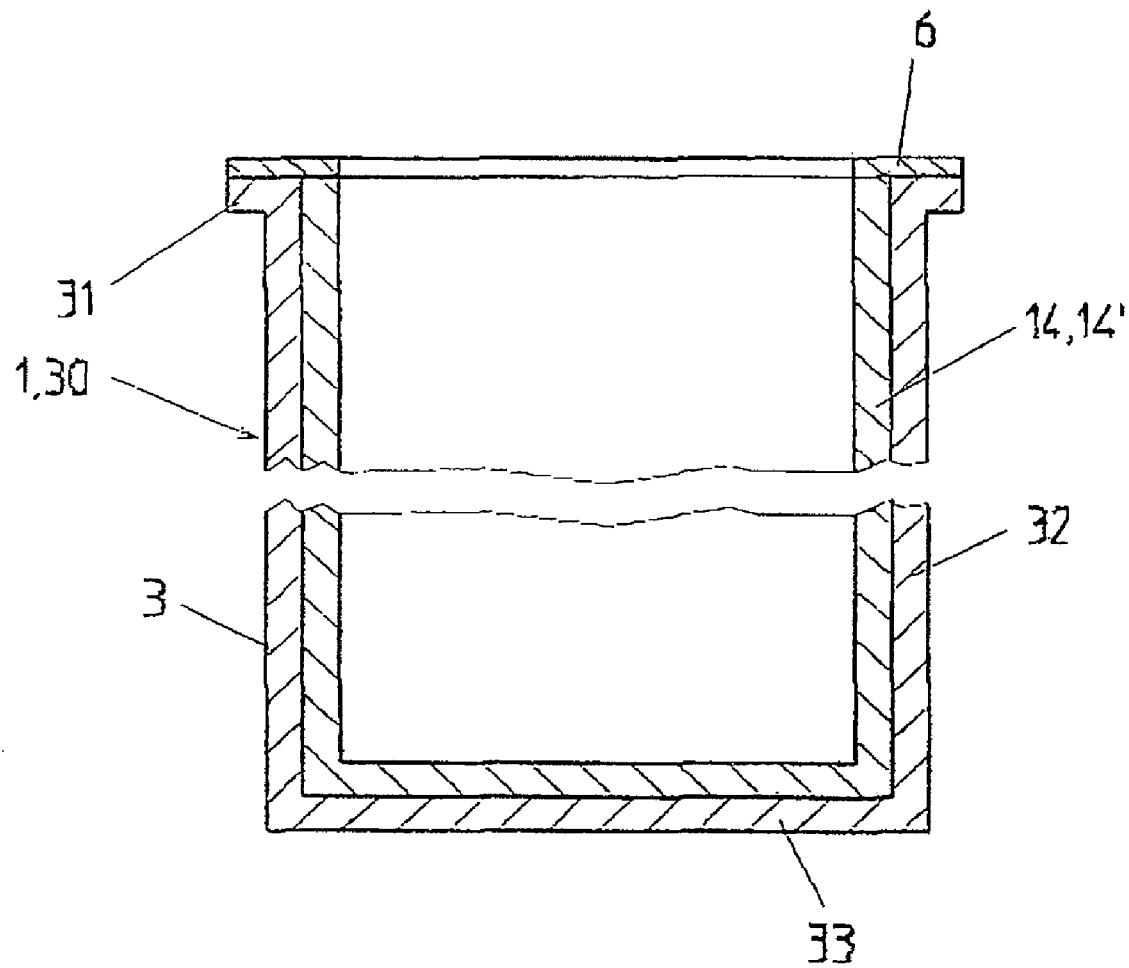

FIG. 9 shows another embodiment that comprises a catalyst body 14' that is also realized in a cassette-shaped fashion and represents a small variation of the formed body 3.

Figure 10:
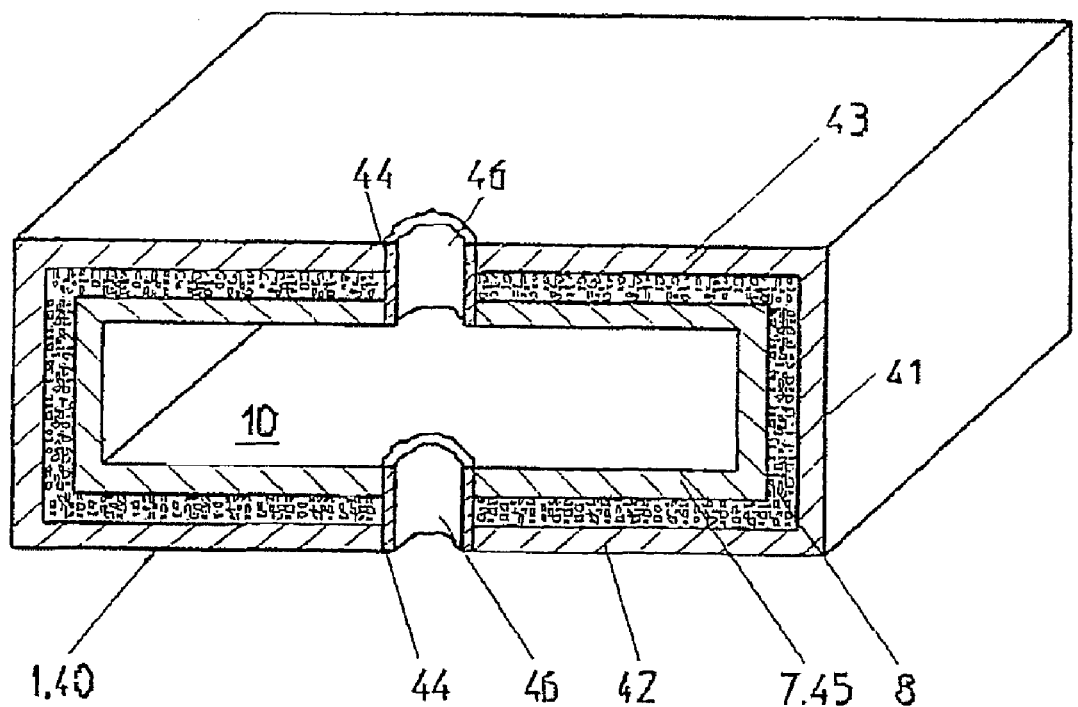

FIG. 10 shows a filter element 1 that is realized in the form of a hollow filter disk 40 and contains a disk-shaped flow channel 10. A disk-shaped formed body insert 45 that is fixed in its position by small holding tubes 44 is inserted into the interior of this filter element such that an intermediate space that is realized identically on all sides and filled with catalyst material 8 is formed between the formed body 3 and the formed body insert 45. The two centrally arranged small holding tubes a form inlet or outlet openings 46 depending on the operating mode of the filter element.

Figure 11:
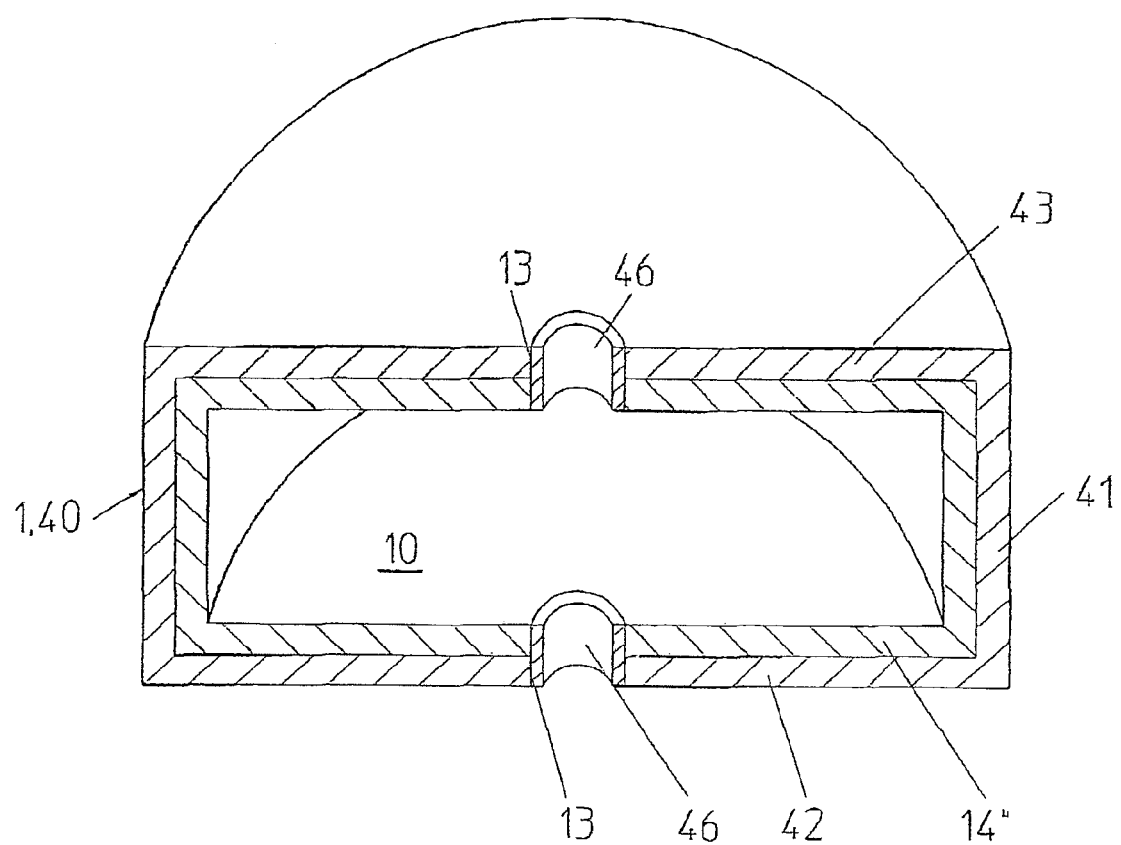

FIG. 11 shows another embodiment with a catalyst body 14" that is also realized in the shape of a disk. The hollow filter disk 40 has a circular shape and comprises bottom and top walls 42, 43, as well as a circular peripheral wall 41 with inlet or outlet openings 46. The catalyst body 14" that is inserted into the disk-shaped interior surrounds the flow channel 10 and represents a small variation of the formed body 3 with respect to its shape and dimensions. A putty or cement is arranged in the inlet and outlet openings 46 in order to fix the catalyst body 14" in its position.

List of reference symbols

| | |
|---|---|
| 1 | Filter element |
| 2 | Filter candle |
| 3 | Formed body |
| 4 | Peripheral wall |
| 5, 5' | Bottom wall |
| 6 | Non-porous tight cover |
| 7 | Formed body insert |
| 7', 7" | Inner tube |
| 8 | Catalyst material |
| 8' | Highly porous material coated with catalyst material |
| 9 | Bottom wall of inner tube |
| 10 | Flow channel |
| 11 | Space for unfiltered fluid |
| 12 | Filtrate space |
| 13 | High-temperature putty or cement |
| 14, 14" | Dimensionally stable porous catalyst body |
| 15 | Edge of opening |
| 16 | Inlet or outlet opening |
| 20 | Filter cylinder |
| 30 | Filter cassette |
| 31 | Flange |
| 32 | Peripheral wall |
| 33 | Bottom wall |
| 34 | Formed body insert |
| 40 | Hollow filter disk |
| 41 | Side wall |
| 42 | Bottom wall |
| 43 | Top wall |
| 44 | Small, non-porous tight tube |
| 45 | Dimensionally stable porous catalyst body in the form of a hollow disk |
| 46 | Inlet/outlet opening |

The invention claimed is:

1. A filter element comprising a dimensionally stable porous formed body with an interior that provides a space for unfiltered fluid or a filtrate space, wherein the interior of the formed body is partially filled with a material of expanded ceramics that is coated with a catalyst material such that a flow channel remains open, wherein the material that is coated with catalyst material is a dimensionally stable catalyst body that adjoins the formed body, and wherein the catalyst material includes one or more oxides or mixed oxides of rare earths and/or of one or more aluminates and/or of one or more silicates and/or of one or more titanates or titanium dioxides.

2. The filter element according to claim 1, wherein the formed body is cylindrical or rectangular with an interior that is closed on one side, wherein the catalyst body is a tube that is open on one or both sides.

3. The filter element according to claim 1, wherein the formed body is with an interior that is open on both sides, wherein the catalyst body is a tube that is open on both sides.

4. The filter element according to claim 1, wherein the formed body is disk-shaped and has a peripheral wall, a bottom wall and a top wall which enclose a disk-shaped interior, wherein an inlet or outlet opening is respectively provided in the bottom wall and in the top wall, and wherein the catalyst body is a disk-shaped body that is smaller than the formed body.

5. The filter element according to claim 1, wherein the catalyst material includes calcium aluminate.

6. The filter element according to claim 1, wherein the catalyst material is modified with catalyst promoters.

7. The filter element according to claim 6, wherein the catalyst material is doped with catalytically active precious metals or non-precious metals.

8. The filter element according to claim 7, wherein the catalyst material is doped with platinum, palladium, rhodium, gold, silver, nickel, copper, manganese, vanadium, tungsten and/or cobalt.

9. The filter element according to claim 2, wherein the catalyst material includes one or more oxides or mixed oxides of rare earths and/or of one or more aluminates and/or of one or more silicates and/or of one or more titanates or titanium dioxides.

10. The filter element according to claim 2, wherein the catalyst material includes calcium aluminate.

11. The filter element according to claim 3, wherein the catalyst material includes one or more oxides or mixed oxides of rare earths and/or of one or more aluminates and/or of one or more silicates and/or of one or more titanates or titanium dioxides.

12. The filter element according to claim 3, wherein the catalyst material includes calcium aluminate.

13. The filter element according to claim 4, wherein the catalyst material includes one or more oxides or mixed oxides of rare earths and/or of one or more aluminates and/or of one or more silicates and/or of one or more titanates or titanium dioxides.

14. The filter element according to claim 4, wherein the catalyst material includes calcium aluminate.

15. The filter element according to claim 5, wherein the catalyst material is modified with catalyst promoters.

* * * * *